April 9, 1968  O. J. REMINES  3,377,147
CHARCOAL STARTING DEVICE
Filed Aug. 25, 1966
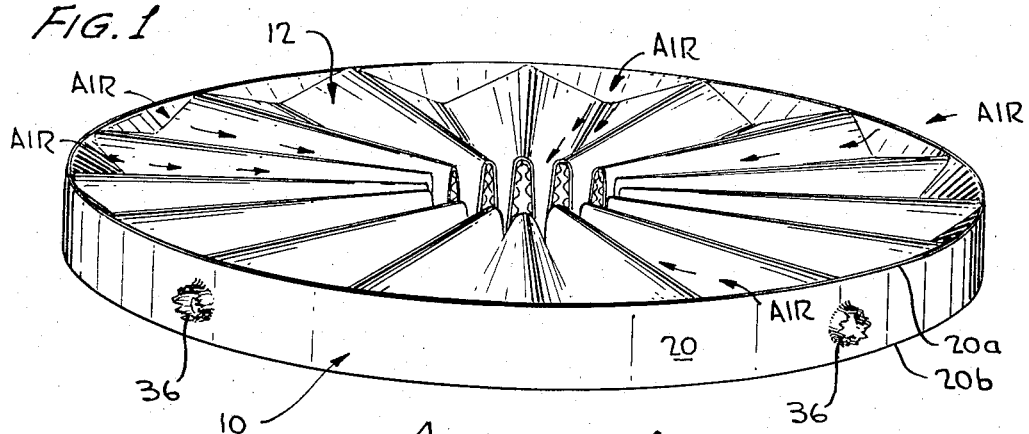
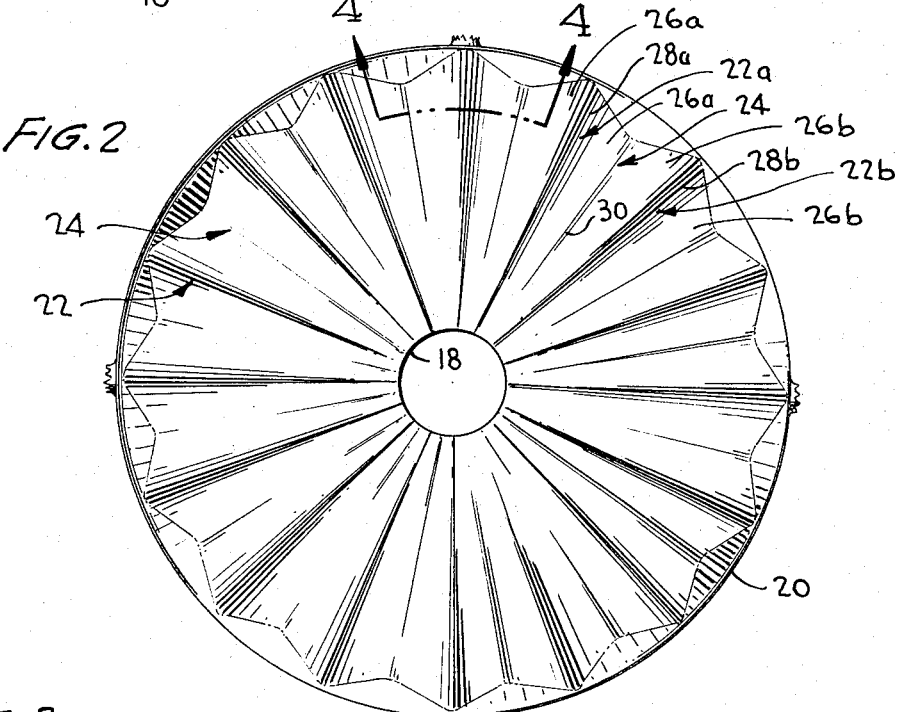
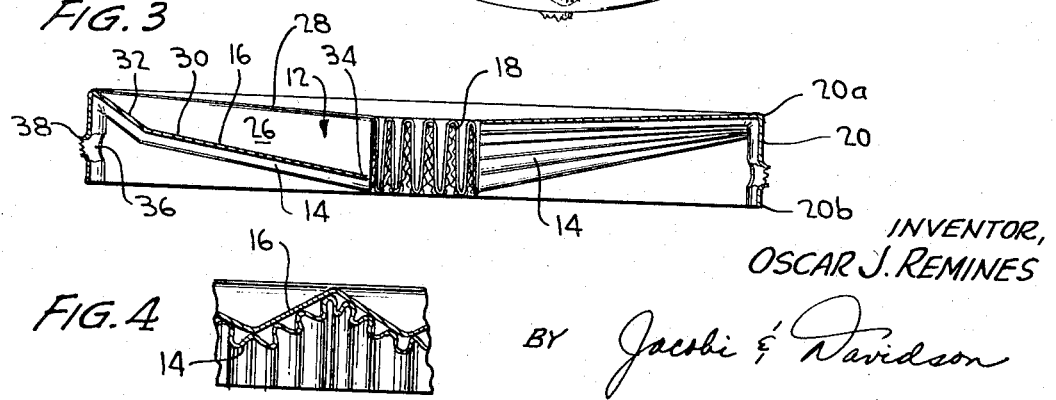
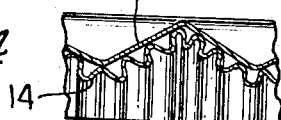
INVENTOR,
OSCAR J. REMINES
BY Jacobi & Davidson
ATTORNEYS 3,377,147
CHARCOAL STARTING DEVICE
Oscar J. Remines, Box 452, Princeton, W. Va. 24740
Filed Aug. 25, 1966, Ser. No. 575,001
6 Claims. (Cl. 44—38)

This invention relates generally to ignition devices and in particular relates to a device for igniting or kindling charcoal briquets.

Outdoor cooking with charcoal briquets has become popular in recent years, and, in most instances, such cooking is done in a grill or blazier. The fuel utilized most commonly in such grills and braziers is compacted charcoal briquets which, when ignited, generate heat for extended periods of time. However, it is somewhat difficult to initially light or ignite these charcoal briquets, and as a result, a variety of different proposals have been suggested for accomplishing such ignition.

Probably the most common means for igniting charcoal is to coat the same with an inflammable liquid. This has been found to be unsatisfactory for at least two reasons, namely, because charcoal treated with such fluid often imparts an undesirable taste to the food being cooked, and perhaps more important, because such fluid is extremely inflammable and explosive, and therefore creates a safety hazard. Another prior proposal which has come into popularity recently is the use of an electric charcoal starting device, but such a device is of only limited utility and cannot be utilized at many picnic areas when no source of electricity is convenient. Finally, there have been various proposals in the prior art to utilize wax-impregnated articles which can be placed between the charcoal briquets and lit to thereby serve to ignite the charcoal. While wax-impregnated articles of this type have been acceptable to some degree, and are at least safer than an inflammable liquid type of charcoal starter, it has been found that such wax-impregnated members only light those charcoal briquets in the immediate vicinity of the article. Even if a great many such wax-impregnated articles were utilized in the normal grill, which is filled with charcoal briquets, the result would be that only certain of the charcoal briquets would be initially lit, and the others would thereafter have to ignite from the initially lit charcoal briquets. As a result, those charcoal briquets which were lighted by the ignition device would be burnt up or consumed far more quickly than the briquets which were not in contact with the ignition device, and the heat thus generated from the overall bed of charcoal would be uneven.

With the foregoing matter in mind, it is, therefore, an object of the present invention to overcome the difficulties and deficiencies associated with prior art techniques and proposals, and to provide in their stead, a new and improved charcoal starting device.

Another object of the present invention is to provide a charcoal starting device which evenly and efficiently ignites an entire bed of charcoal in a relatively short time.

Another object of the present invention is to provide an inexpensive, yet efficient, form of charcoal starting device which does not materially alter the flavor of the charcoal or the food to be cooked thereby.

Another object of the present invention is to provide a charcoal starting device which is safe and non-explosive, yet which can easily be ignited with a minimum of effort.

Other objects, advantages and salient features of the present invention will become apparent from the following detailed description, which, taken in conjunction with the annexed drawing, discloses a preferred embodiment thereof.

Referring to the drawing:

FIGURE 1 is a perspective view of a charcoal starting device in accordance with the principles of the present invention;

FIGURE 2 is a top plan view thereof;

FIGURE 3 is a transverse sectional view thereof; and

FIGURE 4 is a fragmentary sectional view thereof taken substantially along the line 4—4 of FIGURE 2.

Considering the invention in its more detailed aspects, attention is directed to FIGURE 1 wherein there is shown a charcoal starting device in accordance with the principles of the present invention, such device being generally designated 10. The device 10 is fabricated of a wax-impregnated fibre sheet generally designated 12, such sheet preferably being fabricated of single face corrugated cardboard having a series of corrugations 14 covered by a facing layer 16.

The sheet 12 is a single blank of material which can be impregnated with any suitable form of wax material, such as by hot dipping the sheet into boiling wax and allowing the same to remain immersed therein for a few minutes of time, thereby permitting the hot wax to impregnate the fibres of the sheet.

A central hole or opening means 18 is provided at the center of the sheet 12 and the peripheral edge of the sheet is formed into a downwardly depending peripheral flange or skirt 20. In the preferred form of the subject invention, the sheet 12 is of a circular configuration and hence the skirt 20 is disposed in concentric relationship to the central opening 18. That portion of the sheet 12 between the central opening means 18 and the flange 20 is interfolded in such a manner as to create a plurality of alternating ribs 22 and channels 24, such ribs and channels extending radially from the opening means to the skirt.

Considering, for exemplary purposes, two adjacent ribs, the same can be designated 22a and 22b. The rib 22a can be considered as being formed of a pair of identical side walls 26a, 26a joined together at a fold 28a which acts as the apex of the rib 22a. In a similar manner, the rib 22b can be considered as being formed by a pair of similar side walls 26b, 26b which are joined together at a central fold line or apex 28b. The channel 24 which is formed between the ribs 22a and 22b is defined on one side by the wall 26a and on the other side by the wall 26b. These two walls merge together at a juncture or intersection 30 which acts essentially as the bottom central portion of the channel 24.

Hence, in general terms, it can be stated that between the central opening 18 and the peripheral flange 20, the sheet 12 is interfolded into a plurality of undulations formed by the undulating walls 26. Where two walls intersect at a high point, a rib apex 28 is formed and where two side walls 26 intersect at a low point, a channel bottom wall 30 is formed.

In addition to their undulating character, the side walls 26 also have an angularly diverging configuration as they extend from the central opening means 18 to the peripheral flange 20. That is, at the inner ends adjacent the central opening 18, each two side walls 26 forming a rib 22 are in substantial contact with one another. However, as these two side walls 26 extend radially toward the peripheral flange 20, the same diverge angularly from one another.

Considering the peripheral flange or skirt, the same has an upper edge 20a which joins integrally with the remainder of the sheet 12, and a lower edge 20b which serves as the bottom abutment surface for the device 10. That is, in use, it is preferred that the device 10 be oriented with the bottom surface 20b resting against the bottom of the grill or other abutment surface against which the device 10 is applied. In such a position, it will be seen that the facing layer 16 is upwardly directed, while the corrugations 14 are downwardly directed and disposed interiorly of and surrounded by the flange 20.

The height of each rib apex 28 is substantially at a level corresponding to the top surface 20a of the flange 20. As can best be seen in FIGURE 3, there is a slight tapering of the apices 28 as the same extend inwardly from the flange to the central opening 18, but this is a relatively minor taper or draft. On the other hand, the channels 24, as best represented by the central lines 30, taper substantially from the flange 20 to the central opening 18. Each channel 24 can be considered as having an outer end portion 32 adjacent the top 20a of the flange 20, and inner end portion 34 adjacent the central opening 18. The terminus of the outer end portion 32 is necessarily aligned with the top 20a of the flange 20, since the same is integrally connected therewith. On the other hand, the terminus of the inner end portion 34 is substantially aligned with the bottom 20b of the flange so that when the device 10 is oriented in the position shown in FIGURE 1, it is centrally supported as well as peripherally supported.

A plurality of aperture means 36 are formed in the flange 20, preferably in equally spaced relation circumferentially of the flange, with the aperture means 36 being disposed substantially intermediate the portions 20a and 20b. In forming the apertures 36 in the skirt, the fibrous material of the skirt is punched from the inside out to thereby create an outwardly directed shoulder 38 formed of the fibre and having a relatively frayed condition. Thus, the shoulder 38 serves to act as a wick for the device.

If the device is to be used with a grill or the like, the device 10 is inserted into the grill with the bottom 20b of the flange resting upon the surface of the grill. The charcoal is then placed on top of the device 10 to overlie both the ribs 22 and the channels 24. The user then utilizes a match to light each of the shoulders 38 which form wicks for the device 10. Since the shoulders 38 are disposed in equally spaced relationship about the device 10, the same will start to burn inwardly at a relatively even rate. Air flow through the wicks 38 passes toward the central opening means 18. At the same time, air flow also passes through the channels 24 toward the central opening means 18. All of this air flow serves to provide a suitable atmosphere for combustion of the device 10 and the same will readily burn in its entirety, thereby starting all of the charcoal lying thereupon. In use, it has been found that all of the charcoal can be evenly started in about fifteen minutes and at that time, the device 10 will have been entirely consumed by the flame and the heat from the charcoal.

Naturally, the size of the device 10 can be altered as desired, to fit various sizes of grills. Also, if desired, the device 10 can be used in inverted position, with the flange 20 being directed upwardly. This might prove particularly useful if no grill is available, and if the charcoal is merely burnt on the ground. In such event, the flange initially acts as a border to hold the charcoal in position.

After reading the foregoing detailed description, it should be apparent that the objects set forth at the outset of the specification have been successfully achieved by the present invention.

What is claimed is:

1. A charcoal starting device comprising a wax impregnated fibre sheet having a central opening means and a depending peripheral flange, said sheet being interfolded into a plurality of alternating ribs and channels extending between said central opening means and said peripheral flange, said flange having a lower edge for abutting against a supporting surface to support said device, said flange including at least one aperture means therein to facilitate air flow under said device, whereby, when charcoal is placed upon said ribs of said sheet and said sheet is ignited, air will flow through said aperture means and said channels to facilitate ignition of said charcoal.

2. A charcoal starting device as defined in claim 1 wherein said aperture means includes an aperture and a surrounding border, said border being at least partially formed of an outwardly directed portion of said flange which can be ignited to act as a wick for initiating ignition of said sheet.

3. A charcoal starting device as defined in claim 1 wherein said device is substantially circular and wherein said ribs and channels extend radially from said central opening means to said peripheral flange.

4. A charcoal starting device as defined in claim 3 wherein each of said ribs and channels gradually diverges as it extends from said central opening means to said peripheral flange.

5. A charcoal starting device as defined in claim 3 wherein each channel includes a bottom wall having an outer end substantially at a height aligned with the top of said flange and an inner end substantially at a height aligned with the bottom of said flange.

6. A charcoal starting device as defined in claim 1 wherein said fibre sheet is formed of corrugated cardboard of the single face type, with the corrugation being on the underside of said device surrounded by said flange.

References Cited

UNITED STATES PATENTS

| 3,297,420 | 1/1967 | Klink et al. | 44—38 |
| 3,317,290 | 5/1967 | Gentry | 44—41 X |

FOREIGN PATENTS

| 21,897 | 9/1915 | Great Britain. |
| 440,208 | 4/1912 | France. |

CHARLES J. MYHRE, *Primary Examiner.*

R. A. DUA, *Assistant Examiner.*